(12) United States Patent
Matsuda (10) Patent No.: US 9,308,822 B2
(45) Date of Patent: Apr. 12, 2016

(54) METHOD AND SYSTEM FOR DIAGNOSING ELECTRIC VEHICLE

(75) Inventor: Yoshimoto Matsuda, Kobe-shi (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 7 days.

(21) Appl. No.: 14/369,180

(22) PCT Filed: Dec. 26, 2011

(86) PCT No.: PCT/JP2011/007266
§ 371 (c)(1),
(2), (4) Date: Jun. 26, 2014

(87) PCT Pub. No.: WO2013/098873
PCT Pub. Date: Jul. 4, 2013

(65) Prior Publication Data
US 2014/0379209 A1    Dec. 25, 2014

(51) Int. Cl.
*B60L 3/12* (2006.01)
*B60L 15/20* (2006.01)
(Continued)

(52) U.S. Cl.
CPC ............... *B60L 3/12* (2013.01); *B60L 3/0069* (2013.01); *B60L 3/0084* (2013.01); *B60L 3/04* (2013.01); *B60L 11/1803* (2013.01); *B60L 11/1816* (2013.01); *B60L 11/1857* (2013.01); *B60L 11/1864* (2013.01); *B60L 11/1877* (2013.01); *B60L 15/20* (2013.01); *B60L 2200/12* (2013.01); *B60L 2210/30* (2013.01); *B60L 2240/12* (2013.01); *B60L 2240/14* (2013.01); *B60L 2240/421* (2013.01); *B60L 2240/486* (2013.01); *B60L 2240/525* (2013.01); *B60L 2240/545* (2013.01); *B60L 2240/547* (2013.01); *B60L 2240/549* (2013.01); *B60L 2240/622* (2013.01); *B60L 2240/662* (2013.01); *B60L 2250/24* (2013.01); *B60L 2270/145* (2013.01); *B62K 2204/00* (2013.01); *B62K 2208/00* (2013.01);
(Continued)

(58) Field of Classification Search
CPC ..... B60L 15/20; B60L 3/0069; B60L 3/0084; B60L 3/04; B60L 3/12; B60L 11/1803; B60L 11/1816; B60L 11/1857; B60L 11/1864; B60L 11/1877
USPC ........................ 701/34.2, 29.1; 180/65.1, 65.8
See application file for complete search history.

(56) References Cited

U.S. PATENT DOCUMENTS 7,096,984 B2 * 8/2006 Ono et al. .................... 180/65.1

FOREIGN PATENT DOCUMENTS

JP    2002274295    *    9/2002
JP    2002274295 A       9/2002
(Continued)

OTHER PUBLICATIONS

ISA Japanese Patent Office, International Search Report of PCT/JP2011/007266, Mar. 27, 2012, WIPO, 2 pages.

*Primary Examiner* — Marthe Marc-Coleman
(74) *Attorney, Agent, or Firm* — Alleman Hall McCoy Russell & Tuttle LLP (57) ABSTRACT

A method of diagnosing an electric vehicle incorporating an electric component, comprises detecting a physical load applied to a vehicle body, which is other than an electric characteristic of the electric component; and changing a diagnostic operation for the electric component based on the electric characteristic of the electric component such that the diagnostic operation is performed based on the detected physical load applied to the vehicle body.

15 Claims, 7 Drawing Sheets

(51) Int. Cl.
   *B60L 3/00*     (2006.01)
   *B60L 3/04*     (2006.01)
   *B60L 11/18*    (2006.01)

(52) U.S. Cl.
   CPC ............ *Y02T 10/642* (2013.01); *Y02T 10/7005* (2013.01); *Y02T 10/7061* (2013.01); *Y02T 10/7241* (2013.01); *Y02T 10/7275* (2013.01); *Y02T 10/7291* (2013.01); *Y02T 90/127* (2013.01); *Y02T 90/14* (2013.01); *Y02T 90/16* (2013.01); *Y02T 90/162* (2013.01)

(56) References Cited

FOREIGN PATENT DOCUMENTS

| | | | |
|---|---|---|---|
| JP | 2003264906 | * | 9/2003 |
| JP | 2003264906 A | | 9/2003 |
| JP | 2005057961 | * | 3/2005 |
| JP | 2005057961 A | | 3/2005 |
| JP | 2011015491 A | | 1/2011 |

* cited by examiner

| Category | Detection period | Item |
|---|---|---|
| Degree of mechanical impact | During driving, during storage | History of falling, history of impact, history of steering off-road, etc. |
| Internal/external environments of vehicle body | During driving, during storage | Battery temperature, motor temperature, inverter temperature, outside air temperature, etc. |
| Vehicle body control unit | During driving | History of driving, driving speed, motor rotational speed, gear ratio, acceleration/deceleration, etc. |

METHOD AND SYSTEM FOR DIAGNOSING ELECTRIC VEHICLE

TECHNICAL FIELD

The present invention relates to a method and system for diagnosing an electric vehicle.

BACKGROUND ART

In recent years, for the purpose of environmental conservation or the like, a vehicle which drives using electric energy as a driving power source (which, hereinafter, will be simply referred to as an electric vehicle) has been developed. The electric vehicle incorporates many electric components such as batteries for storing DC power, an inverter for converting the DC power stored in the batteries into AC power, and an electric motor activated by the output of the inverter. These electric components operate in association with each other. For example, Patent Literature 1 discloses that an abnormality in an electric component is diagnosed based on an electric characteristic of the electric component.

CITATION LIST

Patent Literature

Patent Literature 1: Japanese-Laid Open Patent Application Publication No. 2011-15491

SUMMARY OF INVENTION

Technical Problem

According to Patent Literature 1, the electric component is diagnosed based on the electric characteristic of the electric component ("electric storage rate," "temperature of battery," "SOC (state of charge) of battery"), but an abnormality cannot be diagnosed until a change actually occurs in the electric characteristic. Therefore, it is difficult to determine in advance whether or not the electric component is broken down.

The present invention has been developed to solve the above described problem, and an object of the present invention is to provide a diagnosing method for preventing in advance an abnormality in the electric component incorporated into the electric vehicle.

Solution to Problem

To solve the above described problem, according to an aspect of the present invention, there is provided a method of diagnosing an electric vehicle incorporating an electric component, the method comprising: detecting a physical load applied to a vehicle body of the electric vehicle, which is other than an electric characteristic of the electric component; and changing a diagnostic operation for the electric component based on the electric characteristic of the electric component such that the diagnostic operation is performed based on the detected physical load applied to the vehicle body.

In accordance with this diagnostic method, a diagnostic process is performed based on the physical load applied to the vehicle body, which is other than the electric characteristic of the electric component, in addition to a diagnostic process based on the electric characteristic of the electric component. Therefore, the electric component can be diagnosed based on the physical load. For example, in a case where there is a great physical load, it is recommended to replace the component or to perform a detailed diagnostic process before an electric characteristic of the component changes, and in this manner an abnormality can be determined earlier or before it happens. More specifically, there is a possibility that the electric component mounted in the electric vehicle suffers from some damage due to the physical load applied to the vehicle body of the electric vehicle, even though the electric component is not actually broken down and its electric characteristic is not changed. For example, in the case of a motorcycle, slight falling such as the falling-down of the vehicle body from a standing position, a vibration due to rapid acceleration/deceleration, a vertical shaking or jumping which is associated with driving off-road, etc., tend to take place. When these occur, an problem in the electric wires or a degradation of performance of the electric component tends to occur. In light of this, by diagnosing the electric component based on the physical load applied to the vehicle body, the abnormality can be diagnosed earlier or before it happens. The normal diagnostic process based on the change in the electric characteristic is performed when the change occurs. In contrast, the diagnostic process based on the physical load is performed based on the physical load even in a state in which there is no change in the electric characteristic. This diagnostic process is a predictive (active) diagnostic process as compared to a passive normal diagnostic process.

In the diagnosing method, changing the diagnostic operation for the electric component based on the electric characteristic of the electric component may include: determining whether or not the electric component is likely to be damaged based on the detected physical load applied to the vehicle body; and changing a diagnostic rule based on the electric characteristic of the electric component such that it is diagnosed more easily that there is an abnormality in the electric component when it is determined that the electric component is more likely to be damaged than when it is determined that the electric component is less likely to be damaged.

There is a possibility that the electric component suffers from some damage (incorrectness of electric wires, a degradation of performance of the electric component, etc.) due to the physical load applied to the vehicle body, which is other than the electric characteristic of the electric component, even though the electric component is not actually broken down and its electric characteristic is not actually changed. In accordance with this diagnostic method, the possibility of such a damage to the electric component can be determined. If it is determined that the electric component is more likely to be damaged, a rider or an owner of the electric vehicle can be notified earlier, as a result of the diagnostic process that there is an abnormality in the electric component. For example, as compared to the diagnostic process based on the electric characteristic of the electric component, a criterion (threshold, or the like) used to estimate an abnormality and diagnose that there is an abnormality in the electric component, may be set more strictly, or more matters may be set to be diagnosed. Or, a time required for the diagnostic process may be increased, or a diagnosing cycle may be set shorter and the number of times the diagnostic process is conducted may be increased. If it is determined that there is an abnormality in the electric component, the rider or the owner may be notified of a need for a maintenance of the electric component or a timing when the maintenance should be performed, in addition to the presence of the abnormality.

In the diagnosing method, the physical load applied to the vehicle body may include a change in a physical amount indicative of a degree of a mechanical impact applied to the vehicle body.

In accordance with the above diagnosing method, it can be determined that the electric component is more likely to be damaged based on the change in "physical amount indicative of a degree of a mechanical impact applied to the vehicle body" in a history of falling, a history of collision, a history of the rider's operation performed off-road, etc. For example, it can be determined that there is a high probability of incorrectness of electric wires or a degradation of performance of the electric component, due to the mechanical impact applied to the vehicle body.

In the above diagnosing method, the physical load applied to the vehicle body may include a change in a physical amount indicative of an ambient temperature of the vehicle body.

In accordance with the above diagnosing method, it can be estimated that the electric component or the like is more likely to be damaged due to a change in "inside/outside environments of the vehicle body" such as the temperature of the battery, the electric motor, or the inverter, or the outside air temperature. For example, it can be determined that the battery is more likely to be in a high-temperature state which causes a degradation of its performance, due to the influence of long-time storage under a high-temperature environment in summer days, etc. The high-temperature environment may be a case where an excessively charged state or excess current state continues for a long time period.

In the above diagnosing method, the electric vehicle may include a vehicle body control unit for controlling the vehicle body; the physical load applied to the vehicle body may include a change in a physical amount supplied to the vehicle body control unit.

In accordance with the above diagnosing method, the sensors mounted in the electric vehicle used to detect the physical amount for use in the vehicle body control of the vehicle body control unit, may be utilized in the diagnostic process based on the physical load applied to the vehicle body, which is other than the electric characteristic of the electric component. This can simplify the configuration of the diagnostic system in the electric vehicle. The sensors for the vehicle body control unit are, for example, a driving history sensor, a driving speed sensor, a motor rotational speed sensor, a gear ratio sensor, an acceleration/deceleration sensor, etc. Therefore, for example, it can be determined that there is a high probability of the operation which worsens a degradation of the battery.

In the above diagnosing method, the physical load applied to the vehicle body may include a change in a physical amount detected during storage of the vehicle body.

In accordance with the above diagnosing method, the diagnostic process can be performed based on the physical load applied to the vehicle body, which is other than the electric characteristic of the electric component, during storage of the vehicle body. For example, the diagnostic process can be performed based on the outside air temperature during storage of the vehicle body, or falling or the like during storage of the vehicle body.

The method of diagnosing the electric vehicle, may further comprise storing the detected physical load applied to the vehicle body; and changing the diagnostic operation for the electric component based on the electric characteristic of the electric component may include changing the diagnostic operation for the electric component based on the electric characteristic of the electric component such that the diagnostic operation is performed based on the stored physical load applied to the vehicle body, when a battery included in the electric component is charged.

In accordance with the above diagnosing method, the diagnostic process can be performed based on the physical load applied to the vehicle body, which is other than the electric characteristic of the electric component, by utilizing the charging time of the battery. In other words, a time used only for diagnosing the electric component can be reduced.

To solve the above described problem, according to another aspect of the present invention, there is provided a diagnostic system in a vehicle incorporating an electric component, comprising: a detecting section which detects a physical load applied to a vehicle body of the vehicle, which is other than an electric characteristic of the electric component; and a control section which changes a diagnostic operation for the electric component based on the electric characteristic of the electric component such that the diagnostic operation is performed based on the detected physical load applied to the vehicle body.

In accordance with the above configuration, the diagnostic process can be performed based on the physical load applied to the vehicle body, which is other than the electric characteristic of the electric component, as well as the diagnostic process based on the electric characteristic of the electric component. Therefore, the electric component can be diagnosed based on the physical load.

To solve the above described problem, according to another aspect of the present invention, there is provided a diagnostic system in a vehicle incorporating an electric component, and the vehicle may include: a memory which stores a detected physical load applied to a vehicle body; and a transmission section which transmits to a device outside the vehicle, the physical load applied to the vehicle body, which is stored in the memory; wherein the device outside the vehicle comprises: a receiver section which receives the physical load applied to the vehicle body, which is transmitted from the vehicle; and a control section which changes a diagnostic operation for the electric component based on an electric characteristic of the electric component such that the diagnostic operation is performed based on the received physical load applied to the vehicle body.

In accordance with the above configuration, the device outside the vehicle is able to perform the diagnostic process based on the physical load applied to the vehicle body, which is other than the electric characteristic of the electric component, at any time without limiting a diagnostic timing. In addition, since it is not necessary to incorporate a circuit and programs for performing the diagnostic process into the vehicle, it becomes possible to reduce the storage capacity of the memory incorporated into the vehicle and the number of the components incorporated into the vehicle. In the above diagnostic system in the vehicle, the vehicle may be an electric motorcycle.

In accordance with the above configuration, in the electric motorcycle, because of its structure, slight falling such as the falling-down of the vehicle body which occurs when it is in a stopped state, vibrations due to rapid acceleration/deceleration, vertical shaking or jumping which is associated with driving off-road, etc., tend to take place. As compared to Patent Literature 1, the electric component of the electric motorcycle is exposed to outside the vehicle body and is easily affected by the outside air temperature as well as the physical impact. This causes damages (incorrectness of electric wires, a degradation of performance, etc.) to the electric component. Therefore, the electric component can be diagnosed based on the degree of a load applied to such an electric component.

The above and further objects, features and advantages of the invention will more fully be apparent from the following detailed description of preferred embodiments with reference to the accompanying drawings.

Advantageous Effects of Invention

In accordance with the present invention, the electric component mounted in the vehicle can be diagnosed in detail.

DESCRIPTION OF EMBODIMENTS

Hereinafter, embodiments of the present invention will be described with reference to the drawings. Hereinafter, throughout the drawings, the same or corresponding components are designated by the same reference numerals, and will not be described in repetition, unless otherwise noted.

(Embodiment 1)

[Exemplary Configuration of Overall System]

In Embodiment 1 of the present invention, it is supposed that an electric vehicle has a function for diagnosing electric components. In other words, the electric vehicle singly configures a diagnostic system.

Figure 1:
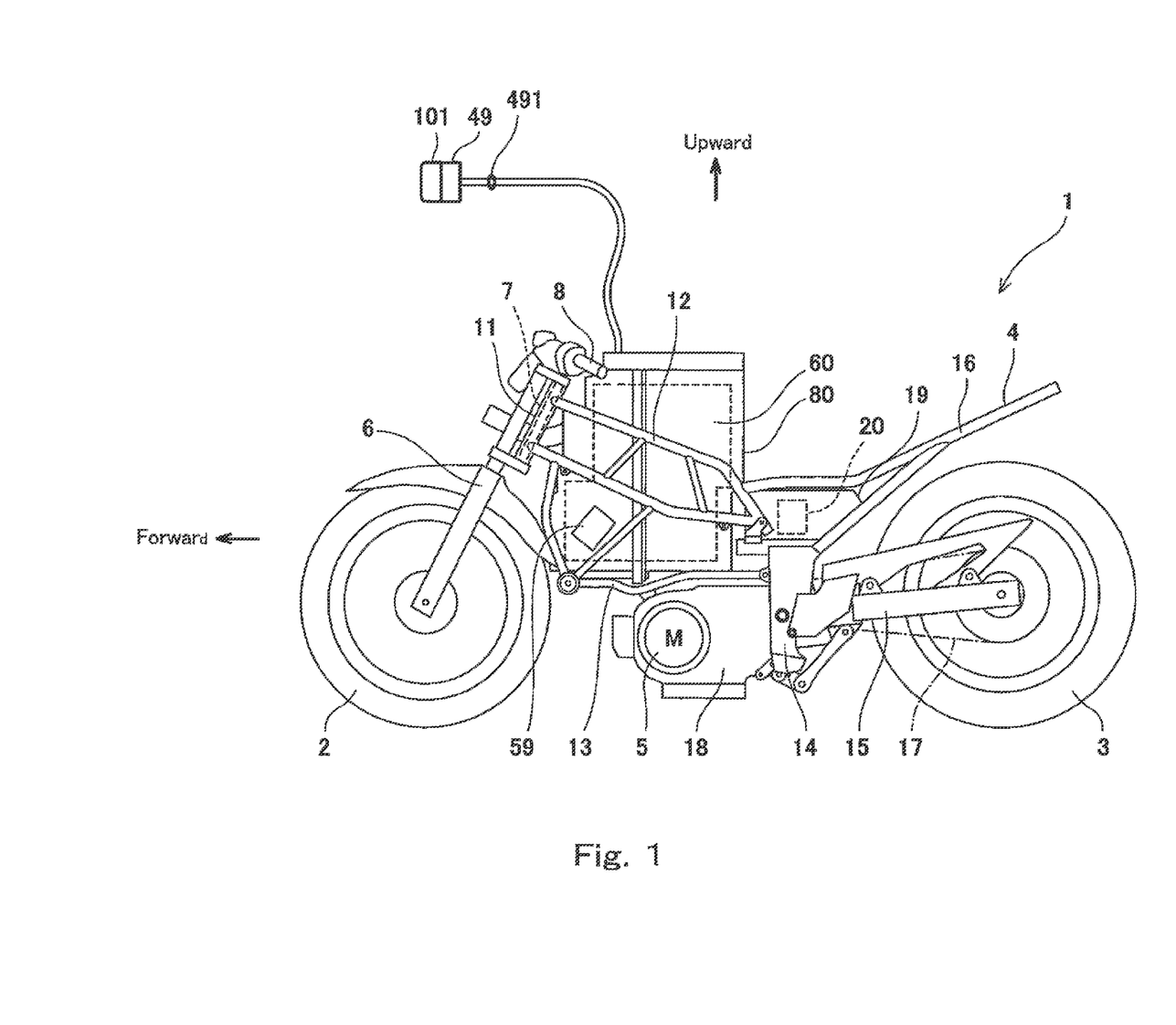
FIG. 1 is a view showing an exemplary overall configuration of a diagnostic system in an electric vehicle according to Embodiment 1 of the present invention.

FIG. 1 is a left side view of the electric vehicle, showing an exemplary overall configuration of the diagnostic system in the electric vehicle according to Embodiment 1 of the present invention. Although an electric motorcycle is exemplarily shown as the electric vehicle in FIG. 1, the electric vehicle is not limited to the electric motorcycle, but may be another straddle electric vehicle (electric three-wheeled vehicle or the like), an electric four-wheeled vehicle having a living space such as a multi-purpose vehicle, or an electric vehicle other than such vehicles, such as a small boat. Or, the electric vehicle may be a hybrid electric vehicle, incorporating an internal combustion engine in addition to the electric motor.

As shown in FIG. 1, an electric motorcycle 1 includes a front wheel 2 which is a driven wheel, a rear wheel 3 which is a drive wheel, a vehicle body frame 4 which is disposed between the front wheel 2 and the rear wheel 3, and an electric motor 5 mounted to the vehicle body frame 4. The electric motorcycle 1 is not equipped with an internal combustion engine and is configured to rotate the rear wheel 3 by driving power generated in the electric motor 5.

The front wheel 2 is rotatably mounted to the lower portion of a front fork 6 extending substantially vertically such that it is inclined with a certain caster angle. A steering shaft 7 is coupled to the upper portion of the front fork 6, and a bar-type handle 8 is attached to the upper portion of the steering shaft 7. A right grip of the handle 8 is a throttle grip which is operated by the rider to adjust the driving power generated in the electric motor 5.

The vehicle body frame 4 includes a head pipe 11, a pair of right and left and a pair of upper and lower main frames 12, a pair of right and left down frames 13, a pair of right and left pivot frames 14, a pair of right and left swing arms 15, and a seat frame 16. The head pipe 11 supports the steering shaft 7 such that the steering shaft 7 is rotatable. The seat frame 16 supports a seat (not shown) on which the rider and a passenger are seated in a forward and rearward direction.

The electric motor 5 is placed in a region which is below the down frame 13 and in front of the pivot frame 14. The driving power generated in the electric motor 5 is transmitted to the rear wheel 3 via a driving power transmission mechanism 17. The electric motor 5 is accommodated in a motor case 18. The motor case 18 accommodates a transmission (not shown) constituting the driving power transmission mechanism 17 together with the electric motor 5, and is suspended from the down frame 13 and the pivot frame 14. The transmission may be a multistage transmission or a gearless transmission. Also, the transmission may be a manual transmission or an automatic transmission.

The electric motorcycle 1 incorporates an inverter case 19 and a battery case 80 in addition to the motor case 18 accommodating the electric motor 5. The inverter case 19 accommodates electric components including an inverter 20. The battery case 80 accommodates the electric components including a battery unit 60. The inverter case 19 is placed in a space of a substantially-inverted triangular space when viewed from a side, which is surrounded by the main frame 12, the pivot frame 14 and the seat frame 16, and positioned just behind the lower rear end portion of the battery case 80. The battery case 80 is placed between the pair of right and left main frames 12, above the lower portions of the pair of right and left down frames 13, and forward relative to the pivot frames 14, and sandwiched between the front wheel 2 and the rear wheel 3 in the forward and rearward direction.

The battery case 80 is provided with a charging connector 49 for charging a battery unit 60 from outside the electric motorcycle. For example, a fitting section of the charging connector 49 may be exposed to the outer surface of the battery case 80, or placed in an opening (charging port) of the battery case 80 and this opening may be covered with a specified cover.

[Exemplary Configuration of Diagnostic System]

Figure 2:
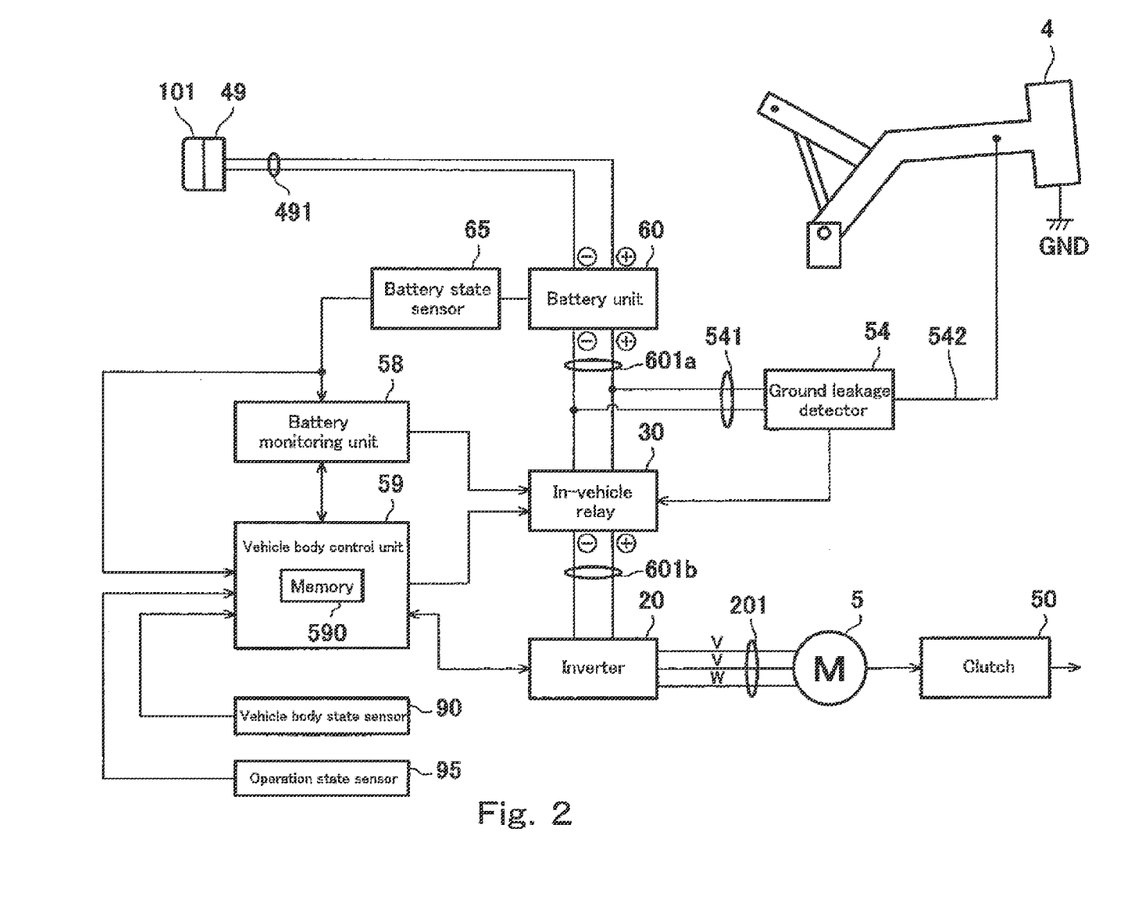
FIG. 2 is a view showing an exemplary configuration of the diagnostic system in the electric vehicle of FIG. 1.

FIG. 2 is a view showing an exemplary configuration of an electric system which represents in particular the electric components and electric wires thereof, as an exemplary configuration of the diagnostic system in the electric motorcycle 1 of FIG. 1.

The battery unit 60 is a unit which serves as a high-voltage and DC power single secondary battery. Specifically, the battery unit 60 is configured as a battery module composed of a plurality of cells which are electrically connected to each other in series, or a cell stack including a plurality of battery modules which are directly electrically connected to each other. The cells are a secondary battery for storing the DC power, such as a lithium ion battery or a nickel metal hydride.

The battery unit 60 is electrically connected to the charging connector 49 via positive and negative charging wires 491, and electrically connected to the inverter 20 via positive and negative electric wires (601$a$, 601$b$). The inverter 20 converts the high-voltage DC power supplied from the battery unit 60 into three-phase AC power in accordance with a torque command or the like from a vehicle body control unit 59, and supplies the three-phase AC power to the electric motor 5 via a three-phase AC wire 201. The electric motor 5 is activated by the AC power supplied from the inverter 20 to generate driving power corresponding to electric characteristics such as a current. This driving power is transmitted to a drive system via a clutch 50.

An in-vehicle relay 30 is placed between the battery unit 60 and the inverter 20. Specifically, the battery unit 60 is electrically connected to the in-vehicle relay 30 via the positive side and negative side electric wires 601a, and the in-vehicle relay 30 is electrically connected to the inverter 20 via the positive side and negative side electric wires 601b. The in-vehicle relay 30 is configured to connect the battery unit 60 and the inverter 20 to each other or disconnect them from each other, in accordance with a command from a ground leakage detector 54, a battery monitoring unit 58 or a vehicle body control unit 59 as will be described later.

The ground leakage detector 54 is electrically connected to the electric wires 601a between the battery unit 60 and the in-vehicle relay 30. The ground leakage detector 54 detects a ground leakage from the battery unit 60 to a vehicle body ground location which is maintained at a ground potential, such as the vehicle body frame 4. For example, the ground leakage detector 54 is connected to electric wires 541 which branch from the electric wires 601a between the battery unit 60 and the in-vehicle relay 30, and also connected to the vehicle body frame 4 maintained at the ground potential, via a ground wire 542. The ground leakage detector 54 includes ground leakage detecting resistors or the like and is configured to detect whether or not there is formed a ground leakage path from the battery unit 60 to the vehicle body frame 4 via the electric wires 601a, 541 and the ground wire 542, according to a voltage drop generated in the ground leakage detecting resistors, etc. The ground leakage detector 54 may directly activate the in-vehicle relay 30 so that the battery unit 60 and the inverter 20 are disconnected from each other upon detecting the ground leakage from the battery unit 60, in addition to the detection of the ground leakage from the battery unit 60. Or, the ground leakage detector 54 may send a result of detection of the ground leakage to the vehicle body control unit 59 so that the vehicle body control unit 59 indirectly activates the in-vehicle relay 30.

The battery unit 60 is electrically connected to a battery state sensor 65. The battery state sensor 65 is defined as sensors for detecting physical loads applied to the battery unit 60. For example, as the battery state sensor 65, there are sensors for detecting "voltage," "current," "internal resistance," "SOC (state of charge)," "SOH (state of health)," and "temperature," as physical amounts indicative of the states of the battery unit 60. Information detected by the battery state sensor 65 is transmitted to the battery monitoring unit 58 and the vehicle body control unit 59.

The battery monitoring unit 58 activates the in-vehicle relay 30 so that the battery unit 60 and the inverter 20 are disconnected from each other, in response to the information indicative of the state of the battery unit 60 which is detected by the battery state sensor 65.

The vehicle body control unit 59 communicates with the battery monitoring unit 58 and shares with the battery monitoring unit 58 the information indicative of the state of the battery unit 60 which is detected by the battery state sensor 65. The vehicle body control unit 59 activates the in-vehicle relay 30 or outputs desired torque command to the inverter 20 in response to the information indicative of the state of the battery unit 60. The vehicle body control unit 59 receives as inputs information indicative of the state of the vehicle body detected by a vehicle body state sensor 90 and information indicative of an operation state of the operation performed by the rider which is detected by an operation state sensor 95, in addition to the information transmitted from the battery monitoring unit 58. The vehicle body control unit 59 also controls the in-vehicle relay 30 and the inverter 20 based on the information received from the vehicle body state sensor 90 and the operation state sensor 95.

The vehicle body state sensor 90 is defined as sensors for detecting physical amounts indicative of the states of the vehicle body. For example, the vehicle body state sensor 90 includes sensors for detecting "physical amounts indicative of degrees of mechanical impacts applied to the vehicle body," and as examples of the vehicle body state sensor 90, there are a falling sensor, a bank angle sensor, an acceleration sensor, a shock sensor, a vehicle speed sensor, a vibration sensor, etc. In addition, the vehicle body state sensor 90 includes sensors for detecting "physical amounts indicative of inside and outside temperatures of the vehicle body," and as examples of the vehicle body state sensor 90, there are sensors for detecting the temperatures of the electric components other than the battery unit 60, such as the electric motor 5 and the inverter 20, and/or an outside air temperature. Furthermore, the vehicle body state sensor 90 includes sensors for detecting information required to control driving (e.g., motor rotational speed, driving speed, front wheel speed, rear wheel speed, mechanical braking amount, battery voltage/current, motor voltage/current), and as examples of the vehicle body state sensor 90, there are a vehicle speed sensor, a front wheel rotational speed sensor, a rear wheel rotational speed sensor, a motor rotational speed sensor, a gear position sensor, a current sensor, a voltage sensor, a stand switch, etc.

The operation state sensor 95 is defined as sensors for detecting the physical amounts indicative of the states of the rider's operation. As examples of the operation state sensor 95, there are a throttle position sensor, a gear position sensor, a brake operation sensor, a clutch operation sensor, a mode switch sensor, etc.

The vehicle body control unit 59 includes a memory 590, which is configured to store "physical amounts (electric characteristics) indicative of the states of the battery unit 60" obtained from the battery monitoring unit 58, "physical amounts indicative of degrees of mechanical impacts applied to the vehicle body" and "physical amounts indicative of inside/outside environments of the vehicle body" which are received from the vehicle body state sensor 90, and "physical amounts indicative of the states of the rider's operation" and "physical amounts used for controlling driving" which are received from the operation state sensor 95. The information stored in the memory 590 is collectively shown in FIG. 3. A timing when the information is stored in the memory 590 is at least before the diagnostic process is initiated, and further is during driving of the electric motorcycle 1, during stop of the electric motorcycle 1, and during storage of the electric motorcycle 1.

The physical loads detected by the sensors are stored in temporal storage areas such as RAM, and arranged at the end of driving. The arranged physical amounts are stored in the memory 590 as histories of the physical loads. The memory 590 is preferably a non-volatile memory from which data is not erased even when electric power is not supplied to it. The memory 590 is preferably data-rewritable. By storing in the non-volatile memory processed values of the physical loads, such as cumulative values, integrated values, average values, and total values of histories of the physical loads, a data volume can be reduced.

The vehicle body control unit 59 is capable of deriving a history of falling, a history of collision, a history of the rider's operation performed off-road, etc., based on the physical amounts used for controlling the vehicle body which are supplied from the sensors and stored in the memory 590. The vehicle body control unit 59 is also capable of deriving a driving history (GPS distance map, etc.), a driving speed, a motor rotational speed, a gear ratio, acceleration/deceleration level, cumulative values of these and average values of these, based on "physical amounts indicative of the states of the rider's operation," which are stored in the memory 590.

It should be noted that the memory 590 may be provided outside (e.g., sensor) of the vehicle body control unit 59.

[Exemplary Diagnostic Process]

Figure 4:
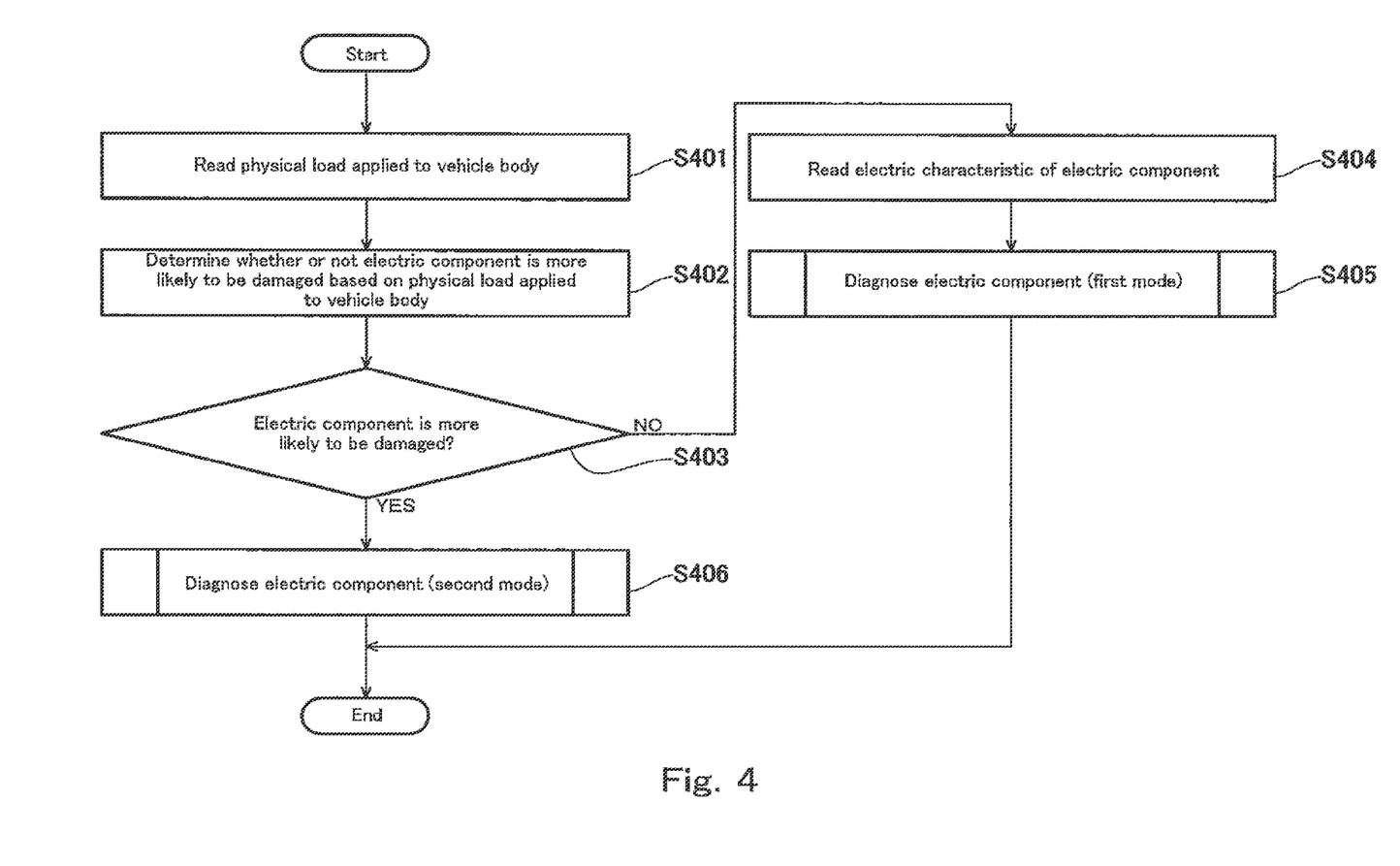
FIG. 4 is a flowchart showing an exemplary flow of a diagnostic process in the electric vehicle according to Embodiment 1 of the present invention.

FIG. 4 is a flowchart showing an exemplary flow of a diagnostic process in the electric vehicle according to Embodiment 1 of the present invention. The electric vehicle (especially vehicle body control unit 59 which serves to control its vehicle body) performs this diagnostic process. Hereinafter, the flowchart of FIG. 4 will be described with reference to the components in the diagnostic system of FIG. 2.

The electric motorcycle 1 reads a physical load applied to the vehicle body from the memory 590 (step S401), and determines whether or not the electric component is likely to be damaged based on the reading of the physical load applied to the vehicle body (step S402). Specifically, as examples of the physical load, there are "physical amounts indicative of degrees of impacts" and "physical amounts indicative of inside/outside temperatures of the vehicle body" which are received from the vehicle body state sensor 90, and "physical amounts indicative of the states of the rider's operation" and "physical amounts used for controlling driving" which are received from the operation state sensor 95.

As examples of the damage to the electric components, there are incorrectness of electric wires and a degradation of performance of the electric components. As examples of the incorrectness of electric wires, there are a disconnection, a ground leakage, a short, etc. Examples of a degradation of performance of the electric components, include a degradation of performance of the cells constituting the battery unit 60, an operation incorrectness of contact points of the in-vehicle relay 30, etc.

When the electric motorcycle 1 determines that the electric component is not very likely to be damaged (step 5403: NO), it reads the electric characteristic of the electric component from the memory 590 (step S404), and diagnoses whether or not there is an abnormality in the electric component based on the read electric characteristic (step S405). Specifically, the example of the electric component to be diagnosed, is the battery unit 60. The battery unit 60's electric characteristics to be detected are the physical amounts (voltage, current, internal resistance, SOC, SOH, temperature, and others) showing the states of the battery unit 60, which are detected by the battery state sensor 65. In this case, the vehicle body control unit 59 diagnoses whether or not there is an abnormality in the battery unit 60 based on the information detected by the battery state sensor 65, which is obtained from the battery monitoring unit 58. Hereinafter, the operation for diagnosing whether or not there is an abnormality in the electric component based on the electric characteristic of the electric component will be referred to as "first mode" for easier description.

On the other hand, when the electric motorcycle 1 determines that the electric component is more likely to be damaged (step S403: YES), it diagnoses whether or not there is an abnormality in the electric component based on the physical load applied to the vehicle body which is read in step S401 (step S406). Hereinafter, the operation for diagnosing whether or not there is an abnormality in the electric component based on the physical load applied to the vehicle body will be referred to as "second mode" for easier description.

Specifically, when the electric motorcycle 1 determines that the physical load which negatively affects the performance of the electric component is greater than a predetermined amount in step S403, it performs the diagnostic process in the second mode in step S406.

For example, in a case where the physical load is an impact value, the second mode may be performed when any one of the following conditions (1 a) to (3a) is satisfied.

(1a) A maximum impact Smax applied to the vehicle body exceeds a predetermined value $\alpha$ (Smax≥S$\alpha$).

(2a) An impact Sup which is a specified value or greater has occurred a predetermined number of times n$\alpha$ or greater (Sup≥n$\alpha$).

(3a) A degree of an impact is divided into X ranks, the number of times ni the impact occurs, corresponding to each rank, is counted, and a weight coefficient ki corresponding to each rank is set. Under this setting, an integrated value which is derived by integrating for each rank a multiplication value of the coefficient k and the number of times n the impact occurs, corresponding to each rank, exceeds a predetermined integrated value $\alpha 1$ ($\Sigma(ki \times ni) \geq \alpha 1$).

For example, in a case where the physical load is an ambient temperature (temperature environment) of the vehicle body, the second mode may be performed when any one of the following conditions (1b) to (4b) is satisfied.

(1b) A maximum ambient temperature Tmax is higher than a predetermined value T$\beta$.

(2b) An ambient temperature Tup of a predetermined value or higher continues for a predetermined time t$\beta$ or longer.

(3b) The ambient temperature is divided into y ranks, a cumulative time ti corresponding to each rank is counted, and a weight coefficient mi corresponding to each rank is set. Under this setting, an integrated value which is derived by integrating for each rank a multiplication value of the coefficient m and the cumulative time t corresponding to each rank, exceeds a predetermined integrated value $\beta 1$ ($\Sigma(mi \times ti) \geq \beta 1$).

(4b) A temperature change $\Delta T$ per unit time exceeds a predetermined value $\Delta \beta$.

For example, in a case where the physical load is a vehicle driving state, the second mode may be performed when any one of the following conditions (1 c) to (4c) is satisfied.

(1c) A driving distance exceeds a predetermined value.

(2c) A cumulative time for which a torque command value (current value) which is a predetermined value or greater is provided exceeds a predetermined value.

(3c) A cumulative time for which a driving speed is a predetermined speed or higher exceeds a predetermined value.

(4c) An acceleration/deceleration level of a predetermined magnitude or greater exceeds a predetermined value.

In addition, the conditions may be set using other physical loads detected before the diagnostic process is initiated, such as the number of times charging is performed, the number of times regeneration is performed, a cumulative charging time, a cumulative discharging time, and a time for which a current of a specified magnitude or greater is charged/discharged.

Although the above described conditions are described individually, the physical loads which negatively affect the performance of the electric components may be collectively found. Specifically, individual damage factors may be converted into parameters, and when a total value of these parameters exceeds a predetermined value B, the second mode may be initiated.

For example, when the following expression is satisfied, the second mode may be initiated:

$$a1 \cdot A1 + a2 \cdot A2 + \ldots an \cdot An \geq B \quad \text{(expression 1)}$$

A1 to An indicate individual physical loads which cause the damages, a1 to an indicate weight factors, and B is a value from which it is estimated in an integrated manner that there is a possibility of damages. Preferably, the physical loads are values which are pre-found before the electric components are diagnosed, and are history values stored from when the electric motorcycle is shipped until before the diagnostic process is performed. The above expression is merely exemplary, and the damages may be predicted using other expressions.

The diagnostic operation is different between the first mode based on the electric characteristics and the second mode based on the physical load applied to the vehicle body. Specifically, when it is determined that the electric component is highly likely to be damaged, the diagnostic operation is made different such that a result of the diagnostic process in the second mode, indicative of the presence of the abnormality, is output earlier than a result of the diagnostic process in the first mode, indicative of the presence of the abnormality.

In other words, the electric component is more likely to suffer from some damage (incorrectness of electric wire, a degradation of performance of electric component, etc.) due to the physical load applied to the vehicle body although the electric component is not actually broken down. In this case, it can be determined that the electric component or the like is more likely to suffer from some damage based on a change in "physical amount indicative of degree of the impact", such as a history of falling, a history of collision or a history of the rider's operation performed off-road. Or, it can be determined that the electric component or the like is more likely to be stuck in a high-temperature state which degrades performance of the battery unit 60 due to a change in "physical amount indicative of the inside/outside temperature of the vehicle body", for example, an influence of excess charging or long-time storage under a high-temperature environment. Or, it can be determined that the electric motorcycle is more likely to be in, for example, a driving state, which would worsen a degradation of the cells of the battery unit 60, based on a change in "physical amount indicative of the state of the rider's operation" or "physical amount used in driving control," such as a history of driving, a driving speed, a motor rotational speed, a gear ratio, or an acceleration/deceleration level.

In these cases, the second mode is designed so that it is diagnosed that there is an abnormality in the electric component in the second mode earlier than it is diagnosed that there is an abnormality in the electric component in the first mode. In other words, regarding the second mode, a diagnostic rule based on the electric characteristic of the electric component is changed so that it is diagnosed more easily that there is an abnormality in the electric component. For example, a criterion (threshold or the like) used to diagnose whether or not there is an abnormality may be set more strictly or a greater number of diagnostic matters may be set in the second mode than in the first mode. Or, a time required for the diagnostic process may be set longer in the second mode than in the first mode. Or, a diagnostic cycle may be set shorter and the number of times of the diagnostic process may be set greater in the second mode than in the first mode. In a case where it is diagnosed that there is an abnormality in the electric component in the second mode, the rider may be notified of a need for maintenance of the electric component or recommended time of the maintenance, as well as the result of the diagnostic process.

Unavoidably, there is a variation among products. Therefore, when it is determined whether or not the component of a certain product in use is correct, it is difficult to find out an actual degradation of the characteristics of the component because this degradation is confused with the variation among the products. To avoid this, in the diagnostic process performed as described above, determination with more detailed levels may be performed, for example, by setting the threshold used for the determination as to correctness of the electric component more strictly, after the electric motorcycle has gone through the mechanical physical load such as the falling.

[Modified Example]

The diagnostic process for the electric component in the first mode (step S405) may also be performed based on the physical load applied to the vehicle body. For example, in a case where falling or the like occurs, it may be diagnosed immediately whether or not there is a degradation in the cells of the battery unit 60, without determining whether or not the electric component is highly likely to be damaged.

In the diagnostic process for the electric component in the second mode (step S406), the content of the diagnostic process may be made different according to the level of the physical load applied to the vehicle body. For example, it is diagnosed that there is an abnormality in the electric component earlier when it is estimated that a degradation/damage is severe. In a case where it is estimated that a degradation/damage is very severe, it may be determined whether or not there is an abnormality in the electric component without being based on the electric characteristic.

Figure 3:
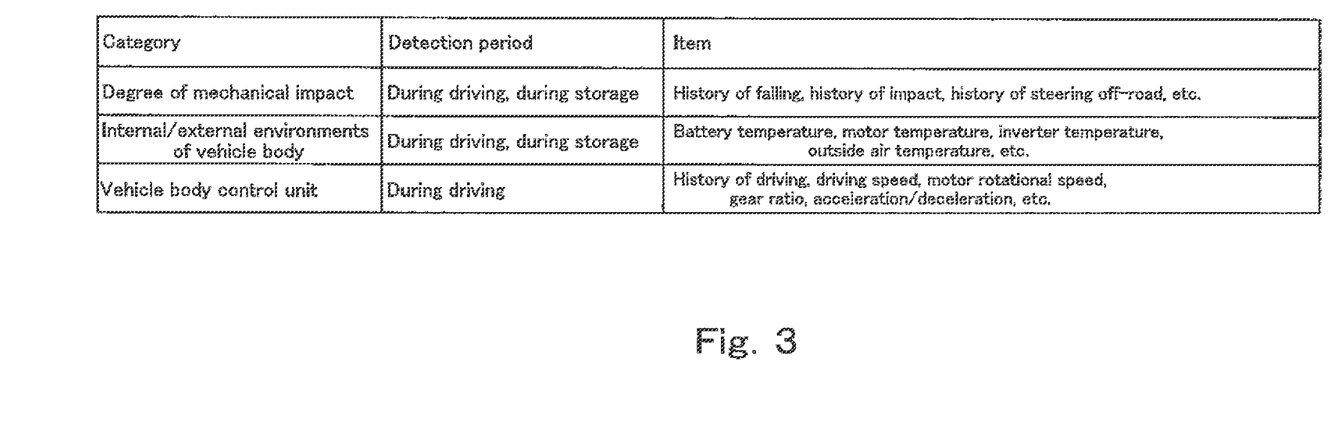
FIG. 3 is a view showing exemplary information stored in a memory of a vehicle body control unit of FIG. 1.

Although the memory 590 of FIG. 3 contains history information of the physical loads applied to the vehicle body, which is other than the electric characteristics of the electric components during driving or during storage, it may be configured to store the history information such that the electric characteristics of the electric components are synchronized with the history information. This makes it possible to identify the electric characteristic of the electric component at a time before and after the physical load is applied to the vehicle body, which is other than the electric characteristic of the electric component. As a result, a detailed diagnostic process for the electric component can be performed.

When a main switch of the electric vehicle is operated after the diagnostic process for the electric component in the second mode is performed (step S406), the electric component may be diagnosed in more detail. If it is determined that there is no abnormality in the electric component as a result of this detailed diagnostic process, the diagnostic process for the electric component in the second mode may shift to the normal diagnostic process for the electric component.

When the electric motorcycle 1 determines that the electric component is less likely to be damaged in step S403 (step S403: NO), it sets a threshold used in the normal diagnostic process. On the other hand, when the electric motorcycle 1 determines that the electric component is more likely to be damaged (step S403: YES), it sets a threshold used in a predictive diagnostic process which is different from the threshold used in the normal diagnostic process. The electric motorcycle 1 may diagnose the electric component using the threshold used in the normal diagnostic process or the threshold used in the predictive diagnostic process.

(Embodiment 2)
[Exemplary Diagnostic Process]

In Embodiment 2 of the present invention, it is supposed that the electric component is diagnosed in the first mode or the second mode during charging of the battery unit of the electric vehicle. The electric vehicle (especially vehicle body control unit 59) performs this diagnostic process.

Figure 5:
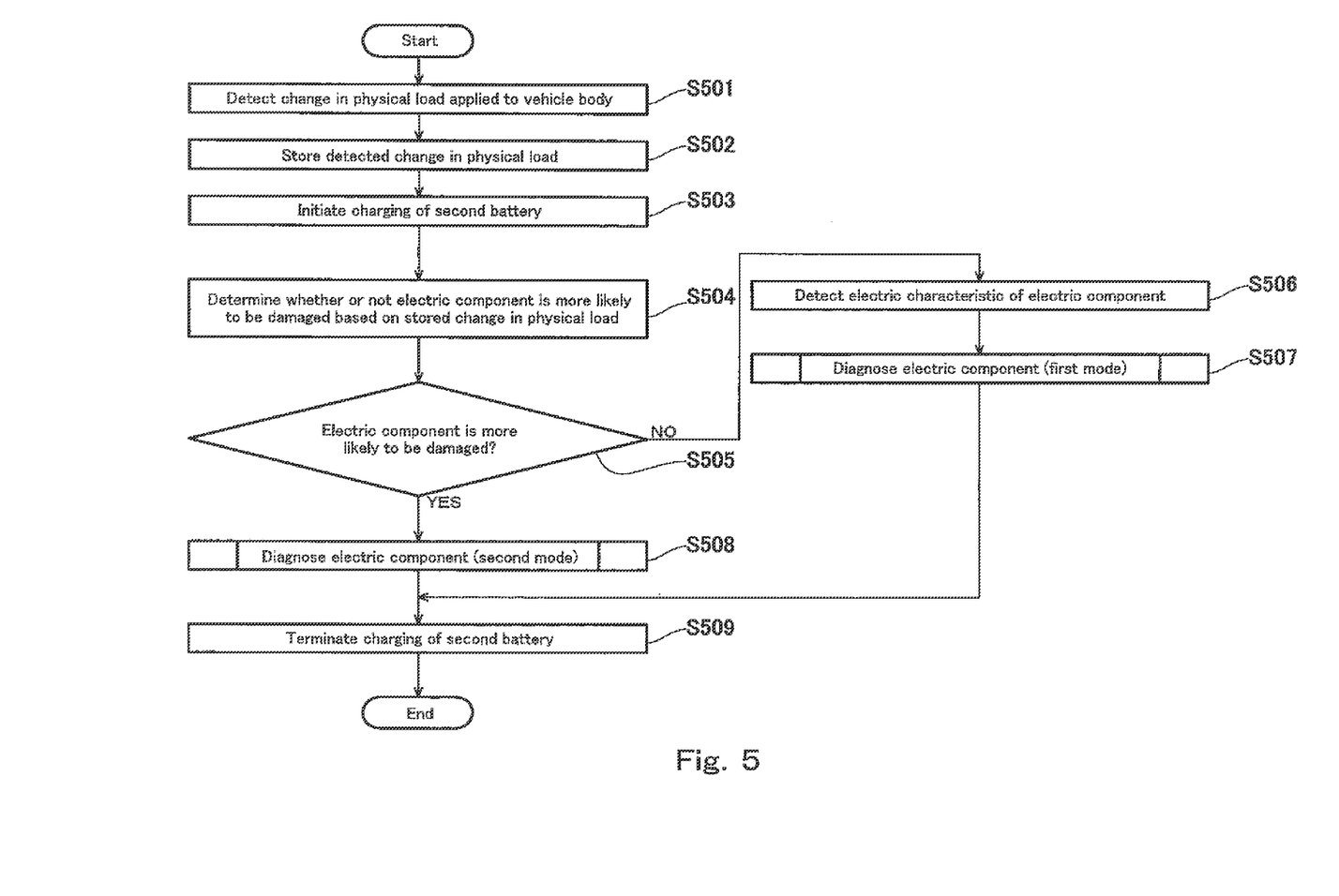
FIG. 5 is a flowchart showing an exemplary flow of a diagnostic process in an electric vehicle according to Embodiment 2 of the present invention.

The exemplary construction of the electric vehicle and the exemplary configuration of the diagnostic system according to Embodiment 2 are the same as those (see FIGS. 1, 2) of Embodiment 1, and will not be described in repetition. Hereinafter, the flowchart of FIG. 5, showing the exemplary diagnostic process of the electric vehicle according to Embodiment 2 of the present invention will be described with reference to the components of the diagnostic system of FIG. 2.

Firstly, before charging of the battery unit 60 is initiated at the start of driving, the electric motorcycle 1 regularly detects the history of the physical loads applied to the vehicle body, using the vehicle body state sensor 90 and the operation state sensor 95 (step S501), and stores the detected information in the memory 590 (step S502). It should be noted that the physical loads applied to the vehicle body may be detected and stored at different timings.

Then, an outside charger (not shown) is connected to the charging connector 49, and thereafter charging of the battery unit 60 is initiated (step S503). Upon the charging of the battery unit 60 being initiated, the vehicle body control unit 59 determines whether or not the electric component is more likely to be damaged based on the information stored in the memory 590 (step S504).

When the electric motorcycle 1 determines that the electric component is less likely to be damaged (step S505: NO), it detects the electric characteristic of the electric component (step S506), and diagnoses whether or not there is an abnormality in the electric component based on the detected electric characteristic (step S507). On the other hand, when the electric motorcycle 1 determines that the electric component is more likely to be damaged (step S505: YES), it diagnoses whether or not there is an abnormality in the electric component based on the physical loads applied to the vehicle body, which are stored in the memory 590 (step S508). After the electric vehicle has diagnosed whether or not there is an abnormality in the electric component, charging of the battery unit 60 is terminated (step S509).

For example, in a case where the electric component is diagnosed when the main switch is turned ON for starting driving, the rider wishes to drive the electric motorcycle 1 quickly. Therefore, a detailed diagnostic process which requires a long time should not be performed. Under this state, unavoidably, a simplified diagnostic process or a diagnostic process only for important matters occurs. In view of the fact that charging of the battery unit 60 requires a relatively long time, and a charging work is performed as a necessary preparation step prior to starting of the electric motorcycle 1 stored for a long time, the time used for which the battery unit 60 is charged can be efficiently utilized. In other words, a time used only for diagnosing the battery unit can be reduced.

[Modified Example]

Although the above description is on condition that the time required for charging of the battery unit 60 is longer than the time required for which it is diagnosed whether or not there is an abnormality in the electric component in the first mode or the second mode, the time required for charging of the battery unit 60 may be shorter than the time required for diagnosing whether or not there is an abnormality in the electric component.

Although in the above description, the electric characteristic of the electric component is detected using the battery state sensor 65 during charging of the battery unit 60 (step S506), the electric characteristic of the electric component may be detected regularly using the battery state sensor 65 and the information may be stored in the memory 590 before charging of the battery unit 60 is initiated. This can omit step S506 in which the electric characteristic of the electric component is detected before the diagnostic process for the electric component in the first mode is initiated.

Although the charging of the battery unit 60 is initiated (step S503) when the outside charger is connected to the charging connector 49 as described above, it may be started when the charging of the battery unit 60 is performed regularly for spontaneous discharging in a case where the electric motorcycle 1 is stored for a long time in a state in which the outside charger (not shown) is connected to the charging connector 49. In other words, the physical load applied to the vehicle body, which is other than the electric characteristic of the electric component, in a case where the electric motorcycle 1 is stored for a long time in a state in which the outside charger is connected to the charging connector 49, may be detected. This makes it possible to perform a diagnostic process considering, for example, the outside air temperature at the time of the storage of the vehicle body, falling at the time of the storage of the vehicle body, etc.

Alternatively, the exemplary configuration and the exemplary diagnostic process which are similar to those of Embodiment 1, and modified examples thereof may be used.

(Embodiment 3)
[Exemplary Configuration of Diagnostic System]

In Embodiment 3 of the present invention, it is supposed that an outside charger which charges the battery unit of the electric vehicle or a host device thereof has a function of diagnosing the electric component. The charger or the host device thereof performs the diagnostic process for the electric component. The charger having such a function will be referred to as a charger with a diagnostic function in the present application.

Figure 6:
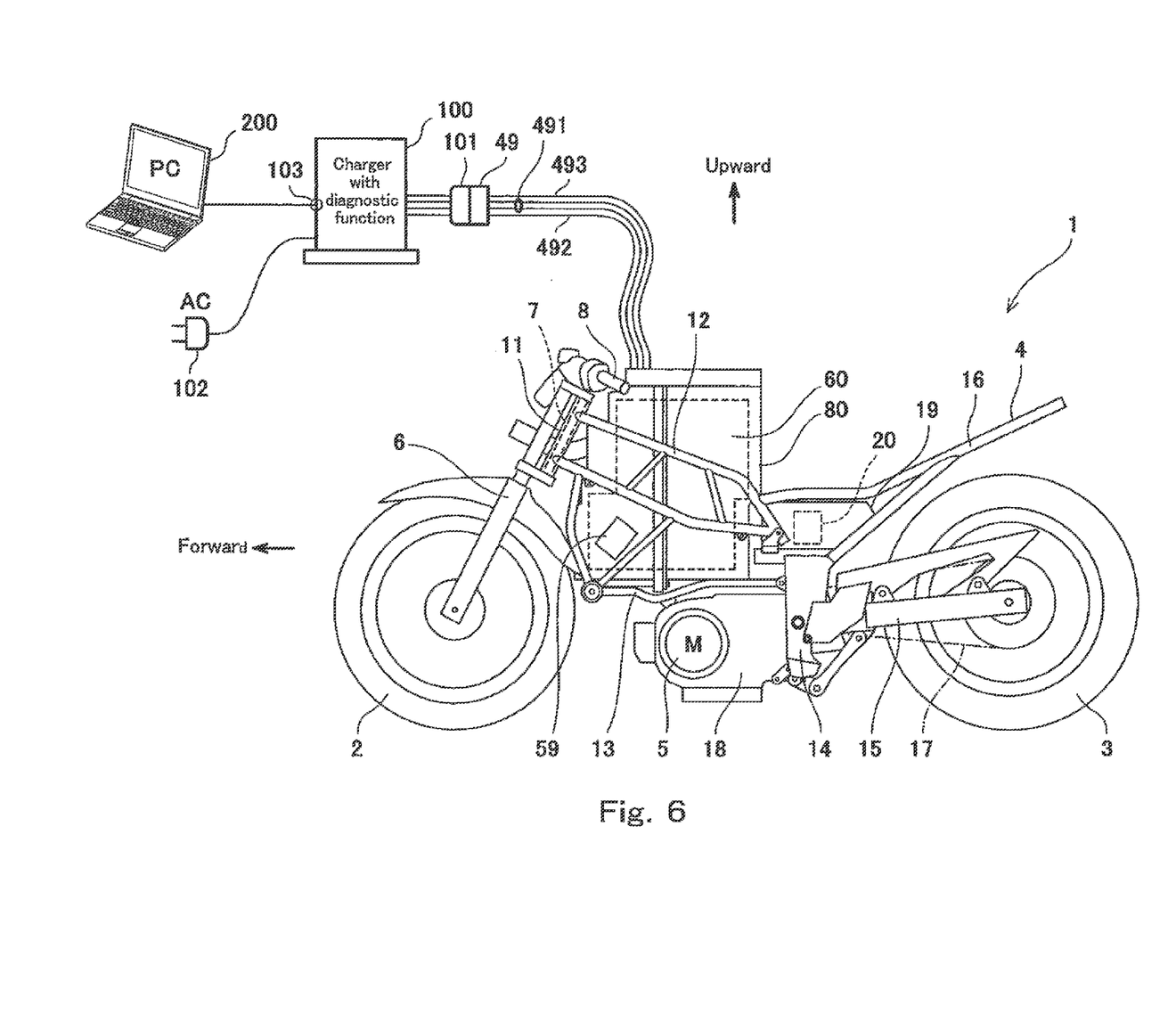
FIG. 6 is a view showing an exemplary overall configuration of a diagnostic system in an electric vehicle according to Embodiment 3, 4 of the present invention.

FIG. 6 is a view showing an exemplary overall configuration of a diagnostic system in an electric vehicle according to Embodiment 3 and Embodiment 4 (described later) of the present invention. Hereinafter, only differences from the exemplary configuration of the diagnostic system of FIGS. 1 and 2 will be described.

The charging connector 49 is configured to electrically and communicatively connect a charger 100 with a diagnostic function to the battery unit 60 accommodated in the battery case 80. In other words, the electric motorcycle 1 is configured to include a transmission section (vehicle body control unit 59, a communication line 492, charging connector 49) for transmitting to the charger 100 with a diagnostic function, the information indicative of the electric characteristic of the electric component or the information indicative of the physical load applied to the vehicle body, which are stored in the specified memory (memory 590 of the vehicle body control unit 59), by using the charging connector 49.

The charging connector 49 is connected to the vehicle body frame 4, or the like kept at a ground potential via a short test line 493 such that signals are communicated between them. Instead of the charging connector 49, a receiving device for non-contact charging may be provided.

The charger 100 with a diagnostic function includes a connector 101 which is fittable to the charging connector 49, an attachment plug 102 connected to a socket (plug-in) of a power supply utility of AC 100V or the like, and a communication interface 103 (interface for wireless communication such as wireless LAN or infrared communication, USB (universal serial bus) interface) communicatively coupled to a host device 200 such as a personal computer, a portable communication device or a server. The charger 100 with a diagnostic function has a structure of ground charging equipment or of ground transmission equipment for non-contact charging. The charger 100 with a diagnostic function is owned in a car parking area by the user of the electric motorcycle 1, placed in a service area called a charging stand or a charging spot, etc. The charger 100 with a diagnostic function has a function of charging the battery unit 60 accommodated in the battery case 80 by fitting a connector 101 to the charging connector 49 of the electric motorcycle 1.

In addition, the charger 100 with a diagnostic function also has a function of diagnosing the electric component incorporated into the electric motorcycle 1, like Embodiment 1 and Embodiment 2. Specifically, the charger 100 with a diagnostic function includes a receiver section (connector 101, A/D converter, etc.) which receives the physical load applied to the vehicle body, which is transmitted from the electric motorcycle 1, and a control section (CPU, DSP (digital signal processor) etc.) which changes the diagnostic operation for the electric component based on the electric characteristic of the electric component such that the diagnostic operation is performed based on the physical load applied to the vehicle body, which is other than the electric characteristic, and received by the receiver section.

[Exemplary Diagnostic Process]

Firstly, the electric motorcycle 1 detects the electric characteristic of the electric component using the battery state sensor 65, and detects the physical load applied to the vehicle body using the vehicle body state sensor 90 and the operation state sensor 95, and stores the detected information in the memory 590.

Then, at a suitable timing, the vehicle body control unit 59 transmits to the charger 100 with a diagnostic function information indicative of the physical load applied to the vehicle body, which is other than the electric characteristic of the electric component, and is stored in the memory 590. In other words, at a time point when the information is transmitted from the vehicle body control unit 59 to the charger 100 with a diagnostic function, the charger 100 with a diagnostic function is electrically connected to the charging connector 49 of the electric motorcycle 1. In this state, the battery unit 60 of the electric motorcycle 1 can be charged by the charger 100 with a diagnostic function, and the charger 100 with a diagnostic function and the vehicle body control unit 59 of the electric motorcycle 1 are communicable with each other. The above stated suitable timing is, for example, a timing when the charger 100 with a diagnostic function is connected to the charging connector 49, or the battery unit 60 is charged regularly for spontaneous discharging in a case where the electric motorcycle 1 is stored for a long time in a state in which the charger 100 with a diagnostic function is connected to the charging connector 49, and the charger 100 with a diagnostic function or the host device 200 is about to initiate the diagnostic process for the electric component.

Receiving the information stored in the memory 590 from the vehicle body control unit 59, the charger 100 with a diagnostic function determines whether or not the electric component is more likely to be damaged based on the information indicative of the physical load applied to the vehicle body, among the received information. When the charger 100 with a diagnostic function determines that the electric component is less likely to be damaged, it diagnoses whether or not there is an abnormality in the electric component based on the information indicative of the electric characteristic of the electric component, among the received information. That is, the charger 100 with a diagnostic function performs the first mode. On the other hand, when the charger 100 with a diagnostic function determines that the electric component is more likely to be damaged, it diagnoses whether or not there is an abnormality in the electric component based on the information indicative of the physical load applied to the vehicle body, which is other than the electric characteristic of the electric component, among the received information. That is, the charger 100 with a diagnostic function performs the second mode which is different from the first mode.

In accordance with the above described process, the charger 100 with a diagnostic function is able to perform the diagnostic process based on the physical load applied to the vehicle body, which is other than the electric characteristic of the electric component, at any time without limiting a diagnostic timing. In addition, since it is not necessary to incorporate a circuit and programs for performing the diagnostic process into the electric motorcycle 1, it becomes possible to reduce the storage capacity of the memory 590 incorporated into the electric motorcycle 1 and the number of the components incorporated into the electric motorcycle 1.

[Modified Example]

Although the charger 100 with a diagnostic function diagnoses the electric component in the first mode or the second mode, as described above, the host device 200 communicatively connected to the charger 100 with a diagnostic function may receive the information from the charger 100 with a diagnostic function, and diagnose the electric component in the first mode or the second mode based on the received information. In this case, the charger 100 with a diagnostic function serves as a relay device (gateway device, bridge device, etc.) which relays communication signals between the host device 200 and the electric motorcycle 1.

Or, an outside device (e.g., electronic key of the electric vehicle) which is electrically and physically connected to the electric motorcycle 1 and is other than the charger 100 with a diagnostic function, may diagnose the electric component in the first mode or the second mode. To effectively utilize the charging time of the battery unit 60, the outside charger connected to the charging connector 49 preferably has a function of diagnosing the electric component in the first mode or the second mode.

Although it is supposed that the charger 100 with a diagnostic function and the host device 200 are placed in the owner's home of the electric motorcycle 1 as described above, the charger 100 with a diagnostic function and the host device 200 may be placed in a charging stand or a charging spot. In this case, the host device 200 may serve as Web server which publishes a dedicated home page which monitors the states of the vehicle body including the battery unit 60 of the electric motorcycle 1, and may be a server connected to the Internet. When the owner of the electric motorcycle 1 connects the owner's personal computer or portable communication device to the Internet and accesses the dedicated home page published by the host device 200, the owner can know a result of the diagnostic process for the electric components mounted in the electric motorcycle 1 as well as the SOC (state of charge) of the battery unit 60.

Alternatively, the exemplary configuration and the exemplary diagnostic process which are similar to those of Embodiments 1, 2 and modified examples thereof may be used.

(Embodiment 4)

[Exemplary Configuration of Pseudo Ground Leakage Circuit of Charger with a Diagnostic Function]

Embodiment 4 of the present invention is on the basis of Embodiment 3 as described above, and is a case which includes a step of determining whether or not the ground leakage detector 54 mounted in the electric motorcycle 1 is operating correctly during the diagnostic process for the electric components mounted in the electric motorcycle 1, which is performed by the charger 100 with a diagnostic function. The ground leakage detector 54 detects a ground leakage from the battery unit 60 to the vehicle body frame 4 or the like which is maintained at a ground potential. The charger 100 with a diagnostic function includes a pseudo ground leakage circuit 110 for intentionally shorting the battery unit 60 and the vehicle body ground location such as the vehicle body frame 4 without actually causing a ground leakage in the electric motorcycle 1 in order to determine whether or not the ground leakage detector 54 is operating correctly.

Figure 7:
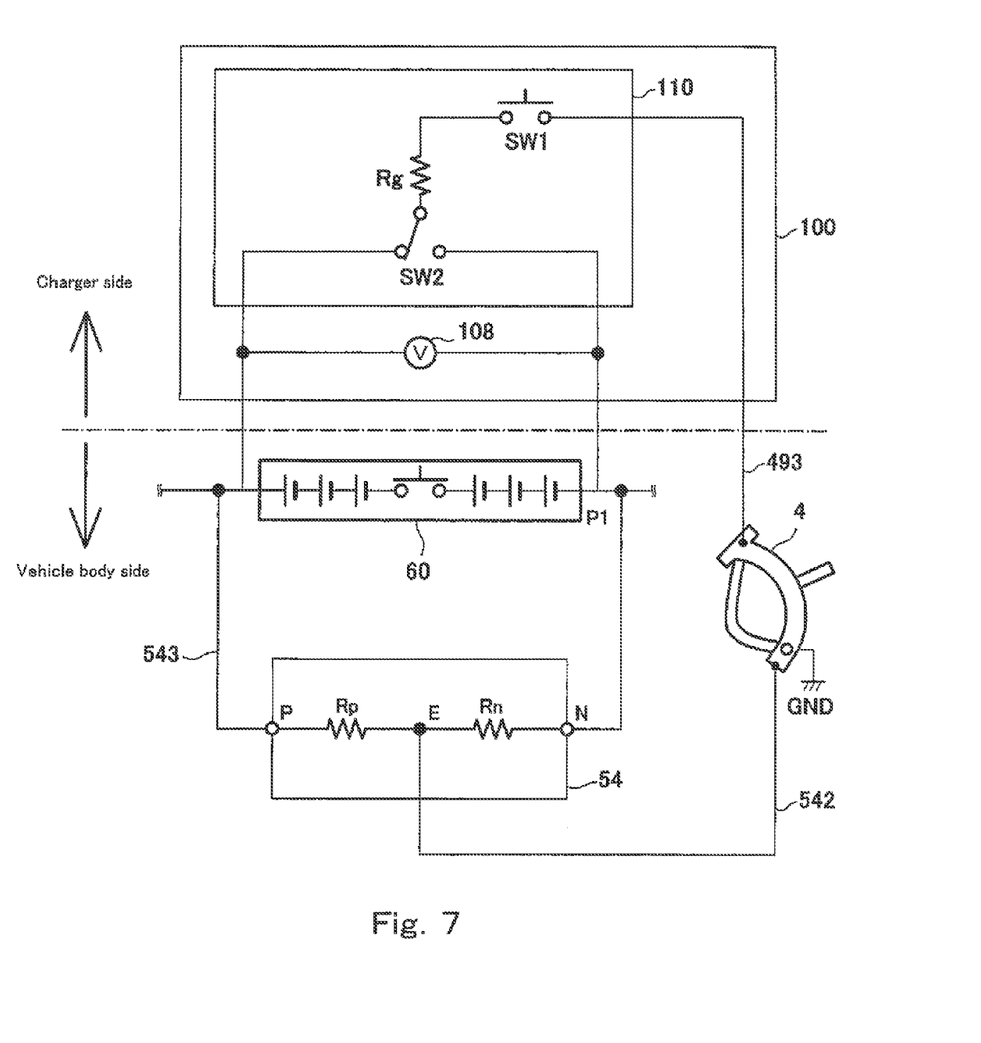
FIG. 7 is a block diagram showing an exemplary schematic configuration of a pseudo ground leakage circuit included in a charger with a diagnostic function of FIG. 6.

FIG. 7 is a block diagram showing an exemplary schematic configuration of the pseudo ground leakage circuit 110 included in the charger 100 with the diagnostic function.

The ground leakage detector 54 includes a positive side power supply terminal P connected to the positive side of the battery unit 60, a negative side power supply terminal N connected to the negative side of the battery unit 60, and a ground terminal E connected to the vehicle body frame 4 via a ground wire 542. The ground leakage detector 54 is configured such that ground leakage detecting resistors Rp, Rn are connected in series between the positive side power supply terminal P and the negative side power supply terminal N, and connection points of the ground leakage detecting resistors Rp, Rn are connected to the ground terminal E. In the case of occurrence of a ground leakage, in the ground leakage detector 54, a current flows through the ground terminal E and thereby a current flowing through the ground leakage detecting resistors Rp, Rn changes from a current in a normal state. Therefore, by detecting this change in the current, it is determined that there is a ground leakage.

The pseudo ground leakage circuit 110 is configured such that a SPST switch SW1, a resistor Rg, a fixed contact point and one of movable contact points of a SPDT switch SW2 are connected in series between the positive side of the battery unit 60 and the vehicle body frame 4. The two movable contact points of the switch SW2 are connected to the positive side and negative side of the battery unit 60, respectively. In addition, a voltage detector 108 is connected in parallel with the two movable contact points of the switch SW2, to detect a voltage between the both ends of the battery unit 60.

In a case where the charger 100 with a diagnostic function determines whether or not the ground leakage detector 54 is operating correctly, the switch SW1 is closed, and the fixed contact point and one of the movable contact points of the switch SW2 are connected to each other. This causes the positive side or negative side of the battery unit 60 to be shorted with the vehicle body ground location such as the vehicle body frame 4. At this time, by detecting a change in the current flowing through the ground leakage detecting resistors Rp, Rn in the ground leakage detector 54, the charger 100 with a diagnostic function determines whether or not the ground leakage detector 54 is operating correctly. If the charger 100 with a diagnostic function determines that it is necessary to perform the diagnostic process in the second mode, it desirably confirms the operation of the ground leakage detector 54 using the pseudo ground leakage circuit 110.

In accordance with the above described exemplary operation, without a need to actually cause a ground leakage in the battery unit 60 of the electric motorcycle 1, the charger 100 with a diagnostic function is able to diagnose whether or not the ground leakage detector 54 mounted in the electric motorcycle 1 is operating correctly. After the charger 100 with a diagnostic function confirms that the ground leakage detector 54 is operating correctly, the abnormality of the ground leakage detector 54 is excluded from possible causes of the damage to the ground leakage detector 54, when the charger 100 with a diagnostic function determines that the ground leakage detector 54 is more likely to be damaged based on the physical load applied to the vehicle body. This makes it possible to quickly detect that a ground leakage has actually occurred in the battery unit 60, due to, for example, a mechanical impact applied to the vehicle body.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Hereinafter, complementary descriptions of the embodiments of the present invention and descriptions of modified examples will be given, while partially repeating the description of the above configuration.

During the storage of the electric motorcycle 1, if the power supply of the vehicle body is ON, the above mentioned physical load can be obtained as in the case of during driving. By providing a configuration in which a degree of impact can be detected for a predetermined period after a power supply OFF command is issued, it can be detected that the vehicle body is highly likely to fall down and discharging from the battery can be prevented because it is not necessary to keep the power supply ON for a long time. In addition, during the charging and storage of the electric motorcycle 1, or during the storage of the electric motorcycle 1 in a state in which the connector is connected, after the charging is finished, the outside charger placed near the vehicle detects the outside air temperature and stores this temperature, and the temperature information is sent to the vehicle body at next connection. This makes it possible to avoid a situation in which the temperature continues to be detected during the storage and hence prevents discharging from the battery.

The vehicle body state sensor may detect the physical amount which negatively affects the physical load (damage cause) of the electric component. The vehicle body state sensor may detect damage causes other than a degree of impact, and an ambient temperature. For example, the vehicle body state sensor may detect inside/outside environments of the vehicle body, such as the number of a vibration of the vehicle body, a degree of humidity, or an air pressure, as the damage cause, and the damage may be estimated using the damage cause. For example, if the degree of humidity is high, or a change in the air pressure is great, the damage is more likely to be accelerated. Also, the frequency and the amplitude of the vibration of the vehicle body with which the damage is more likely to be accelerated, may be confirmed in advance, and this may be used in the diagnostic process as the damage cause.

The diagnostic process may be performed at any time which is other than the time when the main switch is turned ON or the charging is carried out. For example, the diagnostic process may be performed, when the main switch is turned OFF. When the main switch is turned OFF, it may be determined whether or not the diagnostic process in the second mode is necessary based on the history of the physical load stored in a volatile memory after the main switch is turned ON. The power supply may be turned OFF after the diagnostic process is completed. In this case, the volatile memory is unnecessary, and it is less likely that the rider waits for a time for the diagnostic process.

The electric vehicle incorporates many electric components as major components associated with driving, such as the battery, the electric motor, and the inverter. By estimating the damage based on the history of the physical load as in the present invention, it can be determined that the important component associated with driving is broken down, at an appropriate timing. In other words, the determination can be performed earlier without being performed excessively. Since the component which is broken down is repaired as a result of the diagnostic process performed earlier, it is possible to avoid negative effects on driving. Although in the above described example, the diagnosing method of the electric components of the electric vehicle has been described, this may be applied in the same manner to the electric components mounted in vehicles other than the electric vehicle.

Although in the above described example, the battery and the ground leakage sensor are diagnosed based on the history of the physical load which would affect the damage, other electric components may be diagnosed in the same manner. Regarding the operation abnormality of the in-vehicle relay, and the output abnormalities of the inverter, the converter, the sensors, the actuator, and the controller, the diagnosing method may be made different according to the history of the physical load in the same manner. For example, if it is determined that there is a high probability of the damage based on the physical load, the output signals of the sensors, and the number of times the operation of the actuator is confirmed may be increased, or a detailed operation confirmation which is not performed normally, may take place. The operation confirmation may be such that the output signals in a case where control signals/electric power are sequentially supplied to the electric components in a stopped state of the electric vehicle or before a drive current is supplied, are confirmed, and it is determined whether or not signals are output in a predetermined order and in a predetermined range.

In a case where the battery is changed, the histories of the stored physical loads may be preferably reset. This makes it possible to prevent a difference between past and current states of the electric components and the histories of the physical loads. Although the diagnostic operation is made different as described above, the user may be notified that a maintenance is necessary if it is determined that there is a high probability of the damages.

INDUSTRIAL APPLICABILITY

The diagnosing method of the vehicle of the present invention is effectively used to prevent abnormalities in the electric components mounted, in particular, in an electric motorcycle.

REFERENCE CHARACTER LIST

1 . . . electric motorcycle
2 . . . front wheel
3 . . . rear wheel
4 . . . vehicle body frame
5 . . . electric motor
6 . . . front fork
7 . . . steering shaft
8 . . . handle
11 . . . head pipe
12 . . . main frame
13 . . . down frame
14 . . . pivot frame
15 . . . swing arm
16 . . . seat frame
17 . . . driving power transmission mechanism
18 . . . motor case
19 . . . inverter case
20 . . . inverter
30 . . . in-vehicle relay
50 . . . clutch
80 . . . battery case
100 . . . charger with a diagnostic function
101 . . . connector
102 . . . attachment plug
103 . . . communication interface
110 . . . pseudo ground leakage circuit
108 . . . voltage detector
SW1, SW2 . . . switch
200 . . . host device
201 . . . three-phase AC wire
493 . . . short test wire
54 . . . ground leakage detector
542 . . . ground wire
58 . . . battery monitoring unit
59 . . . vehicle body control unit
590 . . . memory
60 . . . battery unit
601a, 601b . . . power supply wire
65 . . . battery state sensor
90 . . . vehicle body state sensor
95 . . . operation state sensor

The invention claimed is:

1. A method of diagnosing an electric vehicle incorporating an electric component, the method comprising:
    detecting a physical load applied to a vehicle body of the electric vehicle, which is other than an electric characteristic of the electric component;
    storing a history of a magnitude of detected physical load applied to the vehicle body; and
    performing a diagnostic operation for the electric component based on the electric characteristic of the electric component concurrently with performing the diagnostic operation for the electric component based on the history of the magnitude of the physical load applied to the vehicle body,
    the history being stored before the diagnostic operation for the electric component is performed.

2. The method of diagnosing the electric vehicle according to claim 1,
    wherein performing the diagnostic operation for the electric component based on the electric characteristic of the electric component includes:
    determining whether or not the electric component is more likely to be damaged based on the detected physical load applied to the vehicle body; and
    changing a diagnostic rule based on the electric characteristic of the electric component such that it is diagnosed more easily that there is an abnormality in the electric component when it is determined that the electric component is less likely to be damaged than when it is determined that the electric component is less likely to be damaged.

3. The method of diagnosing the electric vehicle according to claim 1, wherein the physical load applied to the vehicle body includes a change in a physical amount indicative of a degree of a mechanical impact applied to the vehicle body.

4. The method of diagnosing the electric vehicle according to claim 1,
wherein the physical load applied to the vehicle body includes a change in a physical amount indicative of an ambient temperature of the vehicle body.

5. The method of diagnosing the electric vehicle according to claim 1,
wherein the electric vehicle includes a vehicle body control unit for controlling the vehicle body; and
wherein the physical load applied to the vehicle body includes a change in a physical amount supplied to the vehicle body control unit.

6. The method of diagnosing the electric vehicle according to claim 1,
wherein the physical load applied to the vehicle body includes a change in a physical amount detected during storage of the vehicle body.

7. The method of diagnosing the electric vehicle according to claim 1,
wherein performing the diagnostic operation for the electric component based on the electric characteristic of the electric component includes:
performing the diagnostic operation for the electric component based on the electric characteristic of the electric component such that the diagnostic operation is performed based on the stored history of the magnitude of the physical load applied to the vehicle body, when a battery included in the electric component is charged.

8. The method of diagnosing the electric component according to claim 1, wherein the history is a processed value of the physical load.

9. The method of diagnosing the electric component according to claim 1,
wherein the diagnostic operation for the electric component is performed when the physical load which negatively affects a performance of the electric component is greater than a predetermined amount.

10. The method of diagnosing the electric component according to claim 1,
wherein the diagnostic operation for the electric component is performed when the physical load which negatively affects a performance of the electric component occurs a predetermined number of times or more.

11. The method of diagnosing the electric component according to claim 1,
wherein the diagnostic operation for the electric component is performed in such a manner that a criterion used to diagnose that there is an abnormality in the electric component is set more strict, matters of the electric component to be diagnosed are set more, or the number of times of a diagnostic process is set more.

12. The method of diagnosing the electric component according to claim 1,
wherein the diagnostic operation for the electric component is performed in such a manner that a time required for diagnosing the electric component is set longer, or a diagnosing cycle is set shorter.

13. A diagnostic system in a vehicle incorporating an electric component, comprising:
a detecting section which detects a physical load applied to a vehicle body of the vehicle, which is other than an electric characteristic of the electric component; and
a control section which performs a diagnostic operation for the electric component based on the electric characteristic of the electric component concurrently with performing the diagnostic operation for the electric component based on the history of the magnitude of the physical load applied to the vehicle body.

14. The diagnostic system in the vehicle according to claim 13,
wherein the vehicle is an electric motorcycle.

15. A diagnostic system in a vehicle incorporating an electric component,
the vehicle comprising:
a memory which stores a history of a magnitude of a physical load applied to a vehicle body; and
a transmission section which transmits to a device outside the vehicle, the physical load applied to the vehicle body, which is stored in the memory;
wherein the device outside the vehicle includes:
a receiver section which receives the physical load applied to the vehicle body, which is transmitted from the vehicle; and
a control section which performs a diagnostic operation for the electric component based on an electric characteristic of the electric component concurrently with performing the diagnostic operation for the electric component based on the history of the magnitude of the physical load applied to the vehicle body,
the history being stored before the diagnostic operation for the electric component is performed.

* * * * *